United States Patent
Donier et al.

(10) Patent No.: US 10,657,175 B2
(45) Date of Patent: May 19, 2020

(54) AUDIO FINGERPRINT EXTRACTION AND AUDIO RECOGNITION USING SAID FINGERPRINTS

(71) Applicant: Spotify AB, Stockholm (SE)

(72) Inventors: Jonathan Donier, Stockholm (SE); Till Hoffmann, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 16/172,610

(22) Filed: Oct. 26, 2018

(65) Prior Publication Data
US 2019/0130032 A1    May 2, 2019

(30) Foreign Application Priority Data

Oct. 31, 2017 (EP) .................................. 17199422

(51) Int. Cl.
| | | |
|---|---|---|
| *G06F 17/00* | (2019.01) | |
| *G06F 16/683* | (2019.01) | |
| *G06K 9/62* | (2006.01) | |
| *G06N 3/08* | (2006.01) | |
| *G06F 16/632* | (2019.01) | |
| *G10L 25/30* | (2013.01) | |
| | *G10L 25/54* | |
| (2013.01) | *G10L 25/18* | |
| (2013.01) | | |

(52) U.S. Cl.
CPC .......... *G06F 16/683* (2019.01); *G06F 16/632* (2019.01); *G06K 9/6215* (2013.01); *G06N 3/08* (2013.01); *G10L 25/18* (2013.01); *G10L 25/30* (2013.01); *G10L 25/54* (2013.01)

(58) Field of Classification Search
CPC ........ G06F 3/162; G06F 3/165; G06F 16/683; G06F 16/632; G06K 9/6215; G06N 3/08
See application file for complete search history.

(56) References Cited

U.S. PATENT DOCUMENTS 7,831,531 B1* 11/2010 Baluja .................... G06N 3/08
706/25
2002/0083060 A1* 6/2002 Wang ...................... G10L 17/26
(Continued)

OTHER PUBLICATIONS

Raffel, Colin, and Daniel PW Ellis. "Large-Scale Content-Based Matching of MIDI and Audio Files." ISMIR. 2015. (Year: 2015).*

(Continued)

*Primary Examiner* — Joseph Saunders, Jr.
(74) *Attorney, Agent, or Firm* — Morgan, Lewis & Bockius LLP

(57) ABSTRACT

Methods and a computer-readable storage device are disclosed for generating a frequency representation of a query audio file. The frequency representation represents information about at least a number of frequencies within a time range containing a number of time frames of the audio content information and a level associated with each of said frequencies. At least one of area of data points in the frequency representation is selected. A fingerprint for each selected area of data points is generated by applying a trained neural network onto said selected area of data points thereby generating a vector in a metric space. A distance between at least one of the generated query fingerprints and at least one reference fingerprint is calculated using a specified distance metric. A reference audio file having associated reference fingerprints which have produced at least one associated distance satisfying a predetermined threshold is identified.

13 Claims, 6 Drawing Sheets

(56) References Cited

U.S. PATENT DOCUMENTS

| | | | |
|---|---|---|---|
| 2013/0259211 A1* | 10/2013 | Vlack | G10L 25/54 379/88.01 |
| 2014/0019390 A1* | 1/2014 | Glennon | G06N 5/02 706/12 |
| 2016/0247512 A1* | 8/2016 | Duong | G10L 25/48 |
| 2017/0249957 A1* | 8/2017 | Park | G10L 25/51 |

OTHER PUBLICATIONS

Cano, Pedro et al., "A Review of Audio Fingerprinting," The Journal of VLSI Signal Processing, Kluwer Academic Publishers, BO, vol. 41, No. 3, 1 Nov. 2005 (Nov. 1, 2005), pp. 271-284, XP019216680, ISSN: 1573-109X, DOI: 10.1007/s11265-005-4151-3, 14 pgs.

Cotton, Courtenay V. et al., "Audio fingerprinting to identify multiple videos of an event," Acoustics Spreech and Signal Processing 9ICASSP), 2010 IEEE Inernational Conference on, IEEE, Piscataway, NJ, USA, Mar. 14, 2010 (Mar. 14, 2010), pp. 2386-2389, XP031698099, ISBN: 978-1-4244-4295-9, 4 pgs.

Manocha, Pranay et al., "Content-based Representations of audio using Siamese neural networks," Oct. 30, 2017, arXiv:1710.10974v2, 6 pgs.

Spotify AB, Extended European Search Report, EP17199422.1, dated Apr. 16, 2018, 10 pgs.

Spotify AB, Decision to Grant, EP17199422.1, dated Sep. 19, 2019, 2 pgs.

* cited by examiner

AUDIO FINGERPRINT EXTRACTION AND AUDIO RECOGNITION USING SAID FINGERPRINTS

RELATED APPLICATIONS

This application claims priority to European Patent Application No. EP 17199422, filed Oct. 31, 2017, entitled, "Audio Fingerprint Extraction and Audio Recognition using Said Fingerprints," which is hereby incorporated by reference in its entirety.

TECHNICAL FIELD

The present invention relates to the field of content-based audio recognition. More specifically, it relates to a method for identifying whether a query audio signal and a reference audio signal share similar audio content information, even when the query audio signal or the reference audio signal (or both) have undergone obfuscations, such as changes in pitch, changes in tempo, filtering, or the addition of background noise.

BACKGROUND

Content-based audio recognition is the process of identifying similarities between the audio content of audio files. Performing content-based audio recognition usually involves comparing the audio content of a given audio file, called the query audio file, to the audio content of one or more other audio files, called the reference audio file(s). In many commercial applications, the number of reference audio files is very large, possibly in the order of millions.

The need for accurate, fast, and scalable content-based audio recognition is readily apparent in a wide range of practical situations. For example, the owner of a large musical catalogue may wish to determine whether a newly delivered song exists within that catalogue, even if the musical catalogue contains many millions of entries, and even if the arriving song has no associated metadata besides the audio signal.

Many different content-based audio identification methods are well-known in the prior art. Generally speaking, such methods consist of four phases. In a reference fingerprint ingestion phase, one or more fingerprints, called reference fingerprints, are extracted from the audio content information in each of the reference audio files, and ingested into a database, called the reference database. In a query fingerprint extraction phase, one or more fingerprints, called query fingerprints, are extracted from the audio content information in the query audio file. In a fingerprint matching phase, the query fingerprints are compared to the reference fingerprints in the reference database, to assess their similarity. Finally, in a decision-making phase, a set of decision-making rules are applied to assess whether audio content of the query audio file is similar (or identical) to audio content of one or more of the reference audio files.

A core problem with prior-art content-based audio identification methods is that they tend to perform very poorly on audio signals that have undergone audio obfuscations, such as changes in pitch or tempo, the application of filtering or compression, or the addition of background noise.

By their very nature, the fingerprints that content-based audio identification methods extract have a functional link to the sounds or events (such as rhythmic or melodic structure or timbre) in the corresponding audio files. In prior-art content-based audio identification methods, these fingerprints are typically extracted using pre-specified recipes. For example, a method for extracting fingerprints is disclosed in U.S. Pat. No. 8,586,847, by Ellis et al. In the disclosed method, a music sample is filtered into a plurality of frequency bands, and inter-onset intervals are detected within each of these bands. Codes are generated by associating frequency bands and inter-onset intervals. For a given sample, all generated codes, along with the time stamps indicating when the associated onset occurred within the music sample, are combined to form a fingerprint.

In such prior-art content-based audio recognition methods, the application of audio obfuscations can influence extracted fingerprints in unknown ways. Therefore, the values of fingerprints extracted from unobfuscated audio can vary considerably from the values of fingerprints extracted from the same audio after one or more obfuscations have been applied. This can cause such audio recognition methods to perform poorly in the presence of audio obfuscations. The application of audio obfuscations is common to many practical situations, such as DJs mixing together different songs to create a continuous mix of music. Therefore, there is a clear practical need for content-based audio recognition that performs well in the presence of audio obfuscations.

Another core problem with prior-art content-based audio identification methods is that they tend to perform very poorly at identifying query audio in which some, but not all, of the audio content is shared with one or more reference audio files. Many modern music producers make use of samples taken from other songs, called parent works, to make new songs, called derivative works. Therefore, there is also a clear practical need for content-based audio recognition that can identify a reference audio file sharing at least part of the audio content with a query audio file, to enable automatic detection of the similarities between derivative works and the parent works from which they were derived.

SUMMARY

An object of the invention is to overcome or at least alleviate the problems associated with prior art.

According to a first aspect, a method for identifying an audio reference file that shares audio content information with a query audio sample is provided. The method comprises generating a frequency representation of the audio content information; wherein the frequency representation represents information about at least a number of frequencies within a time range containing a number of time frames of the audio content information and a level associated with each of said frequencies. The method further comprises selecting at least one area of data points in said frequency representation. Moreover, the method comprises generating a fingerprint for each selected area of data points by applying a trained neural network onto said selected area of data points thereby converting the area of data points into a vector in a metric space. Furthermore, the method comprises comparing at least one of said generated query fingerprints to at least one reference fingerprint accessible by a database and generated from a set of reference audio files, by calculating the distance between said at least one generated query fingerprint and at least one reference fingerprint, using a specified distance metric. Moreover, the method comprises identifying a reference audio file, having associated reference fingerprints which upon said measurements of distance have produced at least one associated distance satisfying a predetermined threshold.

According to a second aspect, a method for generating fingerprints for audio content information is provided. The method comprises generating a frequency representation of the audio content information; wherein the frequency representation represents information about at least a number of frequencies within a time range containing a number of time frames of the audio content information and a level associated with each of said frequencies. The method further comprises selecting at least one area of data points in said frequency representation. Furthermore, the method comprises generating a fingerprint for each selected area of data points by applying a trained neural network onto said selected area of data points thereby converting the area of data points into a vector in a metric space.

According to a third aspect, a database comprising a number of generated fingerprints associated with reference audio content information utilizing the method of the second aspect is provided.

According to a fourth aspect, a non-transitory computer readable storage medium having instructions stored thereon that, when executed by a computing device, cause the computing device to perform the method of the first or second aspects is provided.

Also disclosed are examples according to the following numbered clauses:

(A1) In some embodiments, a method for identifying a reference audio file that shares audio content information with a query audio file comprises generating a frequency representation of the audio content information of a query audio file; wherein the frequency representation represents information about at least a number of frequencies within a time range containing a number of time frames of the audio content information and a level associated with each of said frequencies; selecting at least one area of data points in said frequency representation, generating a fingerprint for each selected area of data points by applying a trained neural network onto said selected area of data points thereby generating a vector in a metric space; comparing at least one of said generated query fingerprints to at least one reference fingerprint accessible by a database and generated from a set of reference audio files, by calculating the distance between said at least one generated query fingerprint and at least one reference fingerprint, using a specified distance metric, and identifying a reference audio file, having associated reference fingerprints which upon said measurements of distance have produced at least one associated distance satisfying a predetermined threshold.

(A2) In some embodiments, the method as defined in clause A1 further comprises outputting information about the identified reference audio file to a user.

(A3) In some embodiments of the method as defined in any preceding clause A1-A2, said area comprises information about a subrange of frequencies and a sub-range of time frames of the audio content information.

(A4) In some embodiments of the method as defined in any preceding clause A1-A3, the area of data points is pre-sized.

(A5) In some embodiments of the method as defined in any preceding clause A1-A4, the trained neural network is trained using a Siamese network architecture.

(A6) In some embodiments of method as defined in any preceding clause A1-A5, the trained neural network comprises a number of convolutional layers and/or filters and/or non-linear functions to be applied to the area of data points in sequence.

(A7) In some embodiments of the method as defined in any preceding clause A1-A6, the trained neural network is trained such that the trained neural network produces the same or similar fingerprints for two areas of data points when the two areas of data points contain the same audio content information regardless of the position of the areas of data points in the respective frequency representation.

(A8) In some embodiments of the method as defined in any preceding clause A1-A7, the trained neural network is trained such that the trained neural network produces different fingerprints for two areas of data points when the two areas of data points contain different audio content information.

(A9) In some embodiments of the method as defined in clause A7 or A8 in combination with clause A6, the contents of each convolutional layer and/or filter is determined during said training of the neural network.

(A10) In some embodiments, the method as defined in any preceding clause A1-A9, further comprises storing a number of generated fingerprints associated with an audio file containing audio content information in a memory together with some corresponding frequency information.

(A11) In some embodiments of the method as defined in any preceding clause A1-A10, the calculated distance relates to a Hamming distance.

(A12) In some embodiments of the method as defined in any preceding clause, selecting at least one area of data points is executed by utilizing a trained neural network outputting a salience being a numerical value for each input area of the frequency representation, whereby the trained neural network seeks to minimize the product of a distance between similar areas and their salience, while maximizing the distance between dis-similar areas, while also applying a penalty term for assigning low salience.

(A13) In some embodiments, a non-transitory computer readable storage medium having instructions stored thereon that, when executed by a computing device, cause the computing device to perform the method according to clause A1.

(A14) In some embodiments, a method for generating fingerprints for audio content information, comprises: generating a frequency representation of the audio content information, wherein the frequency representation represents information about at least a number of frequencies within a time range containing a number of time frames of the audio content information and a level associated with each of said frequencies; selecting at least one area of data points in said frequency representation; and generating a fingerprint for each selected area of data points by applying a trained neural network onto said selected area of data points thereby converting the area of data points into a vector in a metric space.

(A15) A database comprising a number of generated fingerprints associated with reference audio content information utilizing the method of clause A1.

Other objectives, features and advantages of the present invention will appear from the following detailed disclosure, from the attached claims, as well as from the drawings. It is noted that the invention relates to all possible combinations of features.

BRIEF DESCRIPTION OF THE DRAWINGS

By way of example, embodiments of the present invention will now be described with reference to the accompanying drawings, in which.

DETAILED DESCRIPTION

The present invention will now be described in more detail.

As described above, conventional methods for content-based audio recognition rely on a pre-defined process for extracting fingerprints from audio files. These methods typically perform very poorly in the presence of one or more audio obfuscations, and are typically unable to detect the similarities between derivative works and the parent works from which they were derived.

To this end, the present invention improves computer technology and is directed to an improvement in the functioning of a computer, since using the method of invention it is now possible to accurately identify audio files that have undergone considerable obfuscations and to identify similarities between derivative works and the parent works from which they were derived. Using the method of the present invention thus enables computers to produce accurate content-based audio recognition on reference audio that has undergone considerable obfuscation, and to produce accurate content-based audio recognition of the constituent parts of derivative works, both of which previously could only be produced by human specialists. However, the method of the present invention approaches the identification of audio content in a much different way than a human would be able to do. Hence, to this end the present method provides a non-conventional and non-generic way to identify audio content, including identifying audio that has undergone considerable obfuscation and including identifying audio related to derivative works, being shared between a query audio file and a reference audio file.

A general idea of the present invention is to take into account areas of data points in a generated frequency representation of the associated audio file, and to use a trained neural network for extracting fingerprints from such areas. The neural network is trained such that the application of audio obfuscations and the alteration of a subset of the pixel values of the frequency representation within a given area does not result in a substantial modification to the extracted fingerprint. This provides a method of extracting fingerprints that is robust to the application of audio obfuscations and that facilitates automatic detection of the similarities between derivative works and the parent works from which they were derived.

Accordingly, an aim of the present invention is to provide an improved method of generating fingerprints for a piece of audio containing audio content information.

Figure 1:
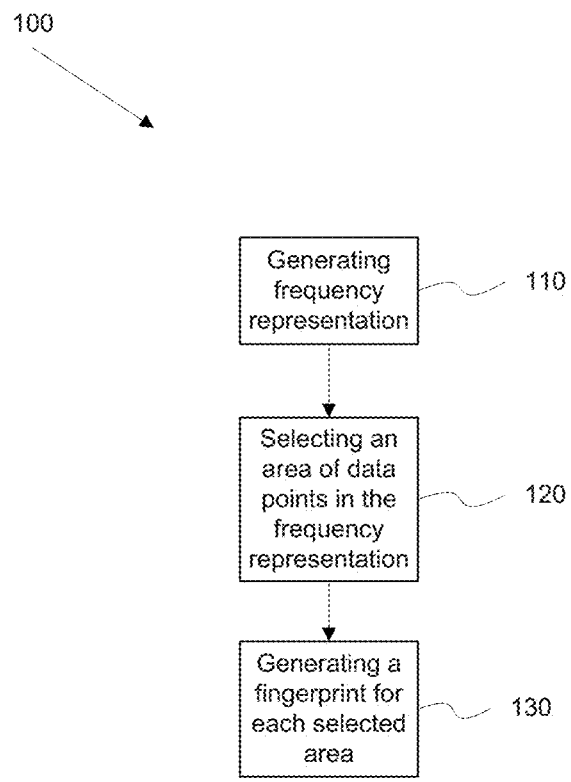
FIG. 1 is a flow chart of a method for generating a fingerprint.

FIG. 1 is a flow chart illustrating a method 100 for generating fingerprints for audio content information. The method comprises generating 110 a frequency representation of the audio content information. The frequency representation represents information about at least a number of frequencies within a time range containing a number of time frames of the audio content information and a level associated with each of said frequencies. The method further comprises selecting 120 at least one area of data points in said frequency representation. Moreover, the method comprises generating 130 a fingerprint for each selected area of data points by applying a trained neural network onto said selected area of data points thereby converting the area of data points into a vector in a metric space.

Audio Content Information

Figure 2A:
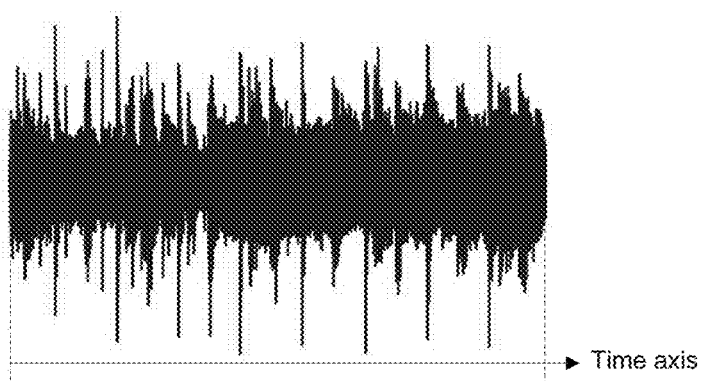
FIG. 2a is diagram visualizing an example of an audio signal.

The audio content information may be an audio signal, such as the audio signal of a piece of music, as illustrated in FIG. 2a. The audio signal may be pre-processed by applying one or more pre-processing techniques. Examples of such pre-processing techniques may include the application of high-pass filters, low-pass filters, audio equalization, and many other techniques well-known to those skilled in the art. The audio signal may be any conventional audio signal relating to any number of audio formats, containing audio information.

Frequency Representation

Figure 2B:
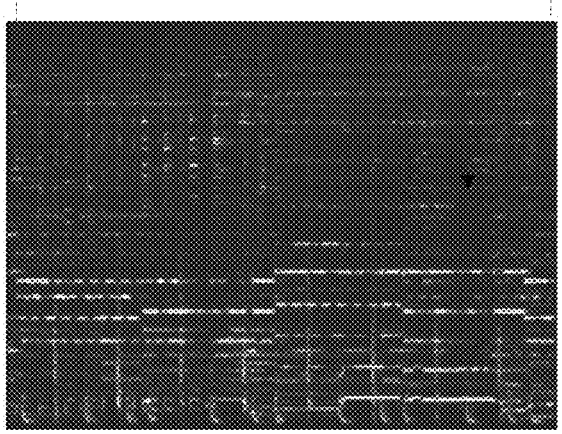
FIG. 2b is a diagram showing the frequency representation of the audio signal.

An example of a frequency representation associated with the audio content information is illustrated as a time-frequency diagram in FIG. 2b.

Referring again to FIG. 2b, the varying intensities of the frequencies is illustrated with different colors/greyscale for different intensities. The frequency representation may be an ordinary time-frequency diagram with a frequency axis and time axis as shown in FIG. 2b. The amplitudes associated with the frequencies of the time-frequency representation for a given time frame may be derived using a Fourier Transform based algorithm, e.g. a Fast Fourier Transform applied to a window of the input audio signal, for a number of successive and possibly overlapping windows. Optionally, a non-linear transformation may be applied to the amplitudes.

The frequency axis of the time-frequency representation may be linear, logarithmic, or some mixture of linear and logarithmic. A row may correspond to just one frequency, or may be a local average of several neighbouring frequencies. Optionally, the time-frequency representation may be a mel scale spectrogram. A mel scale spectrogram provides a more uniform density of information than does a spectrogram with a linear frequency scale, and may therefore be better suited for achieving robustness to changes in pitch and speed.

Area of Data Points

The present invention takes into account areas of data points in a generated frequency representation of the associated audio file. Each area may be selected as a subset of the full time-frequency representation, wherein each data point in an area contains level or intensity information. Such an area may thus have an extension along the time axis and an extension along the frequency axis of the frequency representation.

The actual size of an area may be predetermined, thereby forming a pre-sized area. The size of each area could also be independent of the frequency range that the area spans. Alternatively, the size of each area may depend on the frequency range that the area spans.

Figure 2C:
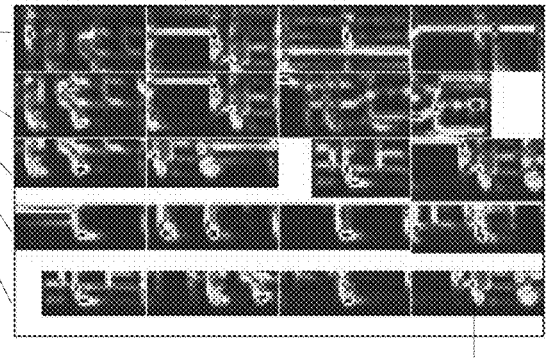
FIG. 2c is a diagram showing identified data points and associated areas in the frequency representation.
Figure 2D:
FIG. 2d is a visualization of a generated fingerprint representing one such area.

FIG. 2c illustrates areas that are selected from the time-frequency representation in FIG. 2b. As may be observed from FIG. 2c, each area comprises information about a subrange of frequencies and a range of time frames of the audio content information. Moreover, each area gives rise to a single fingerprint, as shown with reference to FIG. 2d. The white borders in the FIG. 2c relate to areas where the associated data points are close to the border of the time-frequency representation, so that the associated area goes beyond it, in which case the area can e.g. be zero-padded.

The areas may overlap in the frequency representation. Alternatively, the areas may be chosen to be non-overlapping in the frequency representation.

Neural Network

An aim of utilizing a trained neural network is to produce identical or nearly identical fingerprints for two areas sharing the same or similar audio content, regardless of the relative position (both along the time axis and the frequency axis) of the areas in the associated frequency representations, and regardless of whether audio obfuscations have been applied to the underlying audio signals. Hence, the neural network is trained such that a first area relating to a first sub-range of time frames and a first sub-range of frequencies of a first frequency representation will provide the same or very similar fingerprints as a second area relating to a second sub-range of time frames and second sub-range of frequencies of the second frequency representation, when the audio contents associated with the areas are identical or similar.

Moreover, the neural network is trained such that a first area relating to a first sub-range of time frames and a first sub-range of frequencies of a first frequency representation will provide the same or very similar fingerprint as a second area relating to a second sub-range of time frames and second sub-range of frequencies of the second frequency representation, when the audio content associated to both areas are somewhat similar. For example, a recording of a vocal melody in a first frequency representation and the same recording of a vocal melody but applied with a compressor effect in a second frequency representation should provide for the same or similar fingerprints.

Hence, when utilizing the extracted fingerprints for audio recognition, although the query audio file may have been modified or deformed in view of a reference audio file, e.g. by applying one or more audio obfuscations or overlaying one or more other sounds, many of the extracted fingerprints for the query audio sample will be the same or similar to those extracted from the reference audio file.

One possibility for training the neural network is to use a Siamese network architecture. The network is provided with first pairs of areas that are known (or are likely) to contain similar audio information, and with second pairs that are known (or are likely) to contain dissimilar audio information. The objective of training the network is then to choose a set of parameter values that simultaneously minimize a distance between the fingerprints associated with the first pairs and maximize a distance associated with the second pairs. The actual training may be made in a conventional manner by backpropagation.

The process is iterated until the neural network achieves satisfactory levels of precision and recall for producing similar fingerprints for similar areas and different fingerprints for different areas. Thereafter, the neural network is ready for use in extracting fingerprints in the method presented herein.

As is typical when training neural networks, it is desirable to perform this training with a large number of data points. Generating large numbers of pairs of the second type (i.e., with dissimilar audio information) is relatively straightforward, by simply choosing areas from different audio files with known differences in audio content. Generating large numbers of pairs of the first type may be achieved by applying audio obfuscations to a given audio file, and considering the pair of corresponding areas from the unobfuscated and obfuscated audio. When applying some audio obfuscations, such as the addition of background noise, the corresponding areas may be identified by considering a sub-range of time frames and a sub-range of frequencies in the time-frequency representation of the unobfuscated audio, and the same sub-range of time frames and a sub-range of frequencies in the time-frequency representation of the obfuscated audio. When applying other audio obfuscations, such as changes in pitch or tempo (or both), the corresponding areas may be identified by considering a first sub-range of time frames and a first sub-range of frequencies in the time-frequency representation of the unobfuscated audio, then identifying a second sub-range of time frames and a second sub-range of frequencies in the time-frequency representation of the obfuscated audio, where the second sub-range of time frames and the second sub-range of frequencies are calculated according to how the application of the given audio obfuscation(s) modify the location of sound content within the time-frequency representation.

The second sub-range of time frames and the second sub-range of frequencies may be chosen such that the dimensions of the second area of data points are the same or similar to those of the first area of data points. For example, consider applying a pitch-shifting algorithm that causes the pitch of the audio to increase by 10%, without changing the playback speed. If the first sub-range of time frames spans from 10 seconds to 15 seconds and the first sub-range of frequencies spans from 100 Hz to 200 Hz (both in the first frequency representation), then the second sub-range of time frames will span from 10 seconds to 15 seconds and the second sub-range of frequencies should reflect the application of the pitch-shift (both in the second frequency representation). According to an example, the second sub-range of frequencies may span from 110 Hz to 220 Hz in the second frequency representation, to reflect the exact pitch shift applied to the audio. According to another example, the second sub-range of frequencies may span a sub-rage of frequencies close to 110 Hz to 220 Hz in the second frequency representation.

The trained neural network may comprise applying a number of convolutional and/or linear layers and non-linear functions to each area of data points. The parameters of each convolutional layer may be determined during a training phase, via backpropagation. The associated hyperparameters (such as the number of layers, the size of the filters, etc.), may be determined by performing many different training experiments with many different sets of hyperparameters, and choosing the set that performs best.

Figure 7:
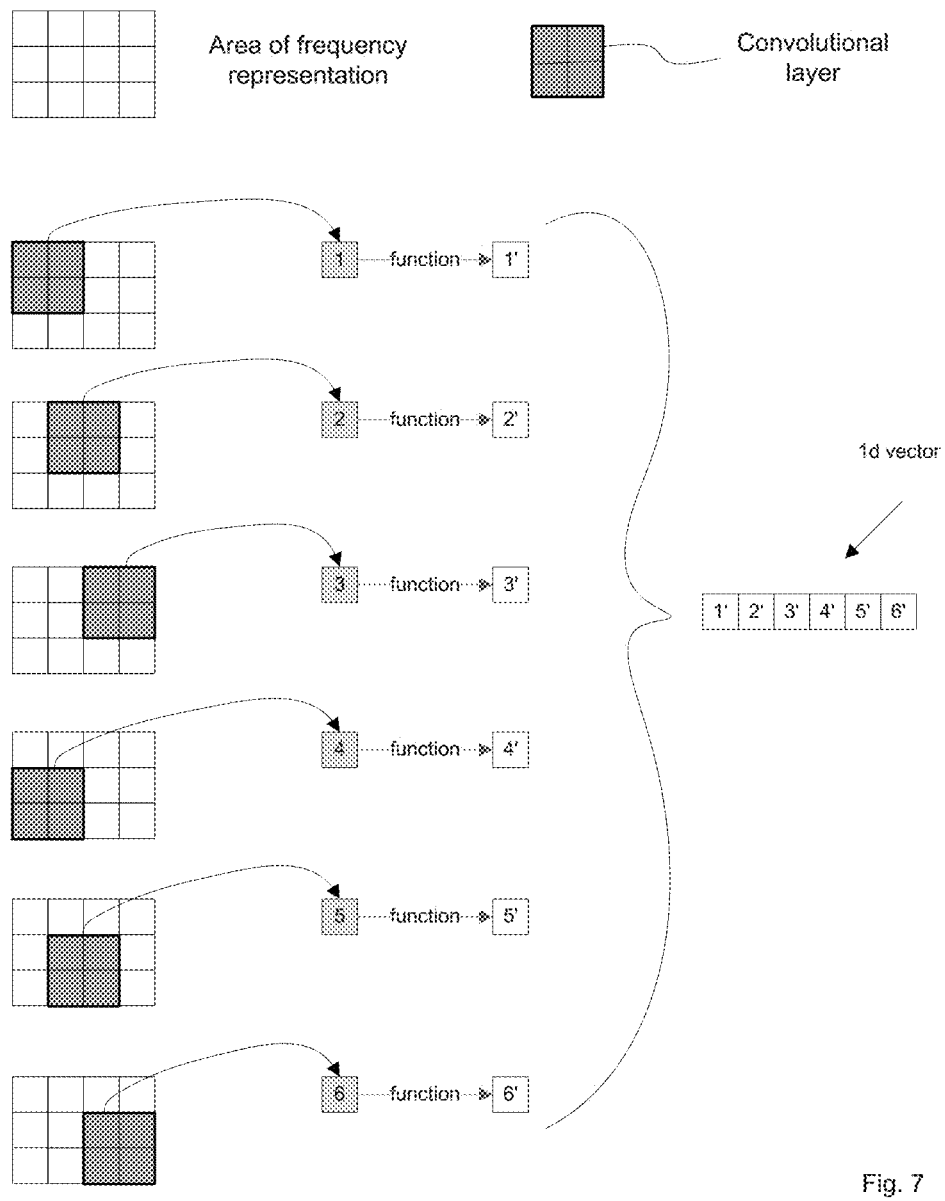
FIG. 7 is a flowchart of producing a 1d vector fingerprint out of an area having a size of 4×3 pixels using a single convolution.

A way of generating 140 a fingerprint for each area (in this case a 4×3 sized area) is further described in relation to FIG. 7. It should be appreciated that while FIG. 7 only shows how to form a fingerprint using one only convolutional layer, the neural network may use a number of convolutional, linear and non-linear layers in parallel and/or in sequence.

Selecting Areas of the Frequency Representation

In theory, any sub-range of time frames and any sub-range of frequencies could be used as an area from which to extract a fingerprint. However, when performing content-based audio recognition, there are several benefits to selecting only a subset of all possible areas for fingerprinting. First, doing so reduces the number of fingerprints in the reference database, which reduces memory requirements for database storage and speeds up database look-ups. Second, doing so reduces the number of fingerprints that are extracted from query audio, which reduces the number of database look-ups required. Third, frequency representations of audio typically contain large regions that do not contain useful information for the purpose of performing content-based audio recognition. For example, in the frequency representation in FIG. 2b, the pixels corresponding to the highest frequencies all have values close to 0, so extracting fingerprints from areas in this region would not result in useful fingerprints. Hence, although it is possible to extract fingerprints from areas containing levels close to zero, such fingerprints would likely not contain useful information. To this end it is possible and preferred to extract fingerprints from areas containing levels above 0.

Prior-art approaches to content-based audio identification typically implement pre-specified recipes to identify areas of the frequency representation from which to extract fingerprints. For example, an area may be selected for fingerprinting if and only if its central pixel is a local maximum. Although this approach is effective for discarding certain regions of the frequency representation from further consideration, such methods produce fingerprints that are not necessarily robust to audio obfuscations. For example, the application of audio obfuscations such as compression may cause a severe performance degradation in methods that search for local maxima to select areas for fingerprinting, because the locations of such local maxima, and thus the pixel content of the corresponding areas, may be significantly altered by the application of the compression. Moreover, the application of some audio obfuscations, such as the addition of background noise, may create many more local maxima in the frequency representation of the obfuscated audio than occur in the frequency representation of the unobfuscated audio.

The decision about which areas of the frequency representation from which to extract fingerprints may in an example be made by utilizing a trained neural network. By way of example, this neural network may be an extended version of the neural network used for extracting fingerprints. Specifically, the neural network may be extended to also output a numerical value, called the salience, for each input area, and the objective function for training the network may be such that the network seeks to minimize the product of the distance between similar areas and their salience (while maximizing the distance between dis-similar areas, with or without considering their salience), while also applying a penalty term for assigning low salience (to prevent the network from assigning low salience everywhere). In this way, during the training phase, the parameters of the extended neural networks are tuned to jointly learn the salience and the fingerprint value.

It is also possible to utilize a separate neural network trained to learn the salience, either given or independently from the fingerprint output from the trained fingerprinting neural network. In this case, the parameters of the separate neural network are tuned to learn the salience such that areas that produce similar fingerprints after applying obfuscations have a high salience, and areas who produce dissimilar fingerprints after applying obfuscations have a lower salience.

The salience of a given area may be used to determine whether or not to extract the corresponding fingerprint. For example, fingerprints may only be extracted from areas whose salience is above a given threshold, such that areas that are likely to produce fingerprints that are not robust to obfuscations are not considered in the first place.

The salience may be restricted to positive values, or to be between zero and one.

Fingerprints

As described above, the aim of applying the trained neural network to the selected area of points of the frequency representation is to extract fingerprints such that the application of audio obfuscations and the alteration of a subset of or all the pixel values within the area of points does not result in a substantial modification to the extracted fingerprint. Each fingerprint may be a binary string, e.g. a 32 bit code (see FIG. 2d.), or a vector whose entries take any continuous value. As shown in FIG. 7, it may be a 6 bit code.

For a given audio file, the method may be used to generate a large number of fingerprints, one for each area. As an example, depending on the size of each time frame and the number of identified data points, a 5-minute long piece of music may be represented as approximately 5000 fingerprints, e.g. represented by 5000 32-bit binary strings.

One advantage of the present invention is that the fingerprints are independent of time. Two fingerprints from the same piece of audio may be identical if they are generated from two identical frequency representations but at different time positions. An example is the beat of a kick drum that repeats through a whole song. All fingerprints generated by an identically sounding kick drum may be generated as identical fingerprints. The information in all but one of the fingerprints would then be redundant, so optionally only one of them may be stored for e.g. use in a database of reference fingerprints or for comparison against a database of reference fingerprints. In reality, many of these fingerprints may be slightly different; thus, each may be stored as different fingerprints.

Because the value of each fingerprint is independent of time, the fingerprints of the present invention may be used to identify similarities between derivative works and the parent works from which they were derived. Derivative works may comprise several pieces of audio, such as music, intertwined with each other. The present invention enables both finding which pieces of audio were used in a specified derivative work and finding which derivative works were made from a specific piece of audio.

The generated fingerprints associated with an audio file containing audio content information may be stored in computer memory, together with their respective frequency or frequency range, and any other metadata about the audio file.

Database

Figures 3, 4:
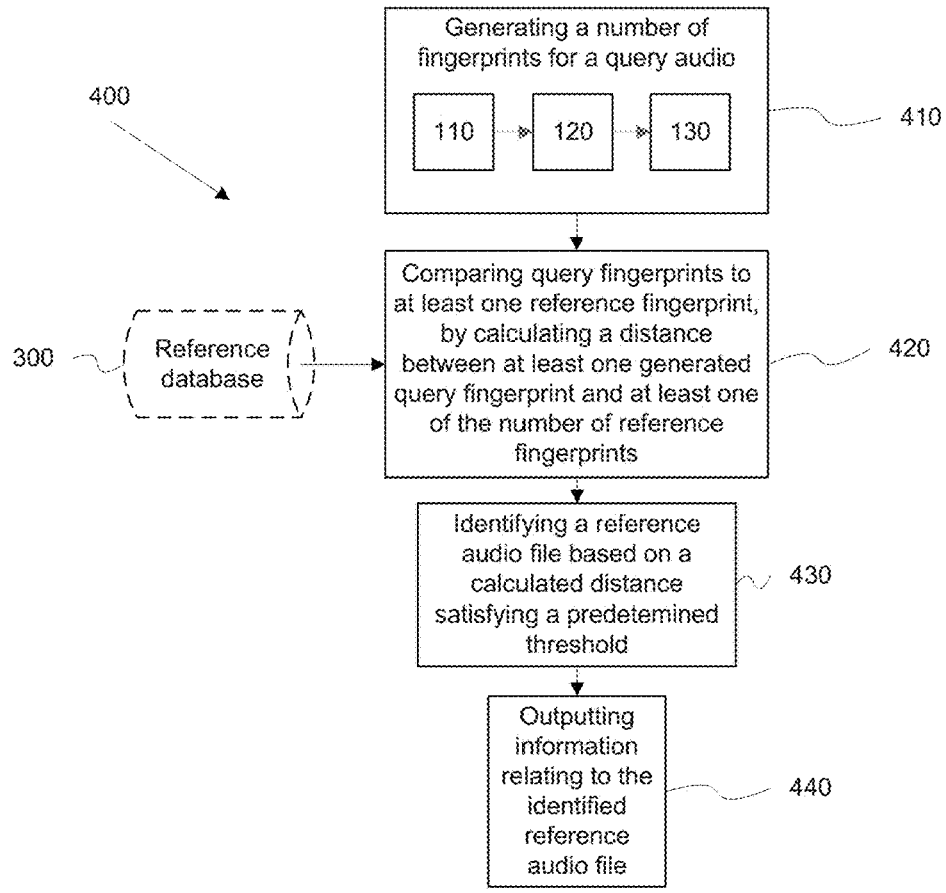
FIG. 3 is a graphical representation of a reference song database.
FIG. 4 is a flow chart of an example embodiment of a method for identifying a reference audio file.

FIG. 3 illustrates an example of a database 300 comprising a number of fingerprints generated using the method 100. Each entry in the database may be a (key,value) pair, where the key is the fingerprint and the value describes both the audio file and the sub-range of frequencies ($f_1$ to $f_n$) for the selected area of the frequency representation from which the fingerprint was extracted. It should be appreciated that more than one frequency range may appear for the same fingerprint and the same audio file information. Looking at FIG. 3, it should be appreciated that e.g. $f_1$ of fingerprint 1 may be different from frequency range $f_1$ of fingerprint 2, so the $f_1$ notation should be seen as generic when interpreting FIG. 3.

Hence, in view of FIG. 3, each fingerprint may be stored with information of a number of pieces of audio in which it appeared. For example, the fingerprints may be stored with a number of different work IDs of the associated audio files and/or the frequency bands of their associated areas of data points.

However, in an alternative embodiment, all fingerprints generated from a specific piece of audio may be grouped together.

Using the Extracted Fingerprints for Audio Recognition

FIG. 4 is a flow chart of a method 400 for identifying a query audio file that shares audio content with a reference audio file. The method comprises generating 410 a number of query fingerprints for the query audio sample using method 100 described in relation to FIG. 1. To this end, the generating 410 comprises the steps of generating 110, selecting 120, and generating 130 as presented in view of FIG. 1 above. Moreover, the method comprises comparing 420 at least one of the generated query fingerprints to a number of reference fingerprints generated from a set of reference audio files and accessible by a database 300. The comparison is performed by calculating the distance between the at least one generated query fingerprint and a number of reference fingerprints, using a suitable distance metric. More precisely, for a given query fingerprint $f_q$ and a given reference fingerprint $f_r$, let $d(f_q, f_r)$ denote the distance between $f_q$ and $f_r$, measured using some specified distance metric. For example, if $f_q$ and $f_r$ are real-valued vectors, then $d(f_q, f_r)$ may be the Euclidean distance between $f_q$ and $f_r$. As another example, if $f_q$ and $f_r$ are binary strings, then $d(f_q, f_r)$ may be the Hamming distance between $f_q$ and $f_r$.

The method further comprises identifying 430 an audio file that has associated reference fingerprints which upon the measurement of such distance have produced at least one associated distance satisfying a specified threshold. Moreover, the method may comprise outputting 440 information about the identified reference audio file to a user.

The identifying 430 may then comprise returning each reference audio file with at least a predetermined number of fingerprints producing a distance (when measured against the query fingerprints) satisfying a specified threshold.

The method 400 may be used to find an exact duplicate, in which case all or almost all fingerprints match. The method may also be used to find a modified, deformed, or otherwise obfuscated file, or to identify similarities between a derivative work and the parent work(s) from which it was derived, in which case some subset (and perhaps just a few) of the fingerprints match.

Hardware Environment

The method of may be run as software instructions in computer program code on a processor with memory for extracting the fingerprints of the associated audio content information.

The method(s) provided herein may also be implemented in a non-transitory computer readable storage medium having instructions stored thereon that, when executed by a computing device, cause the computing device to perform the associated method.

Figure 5:
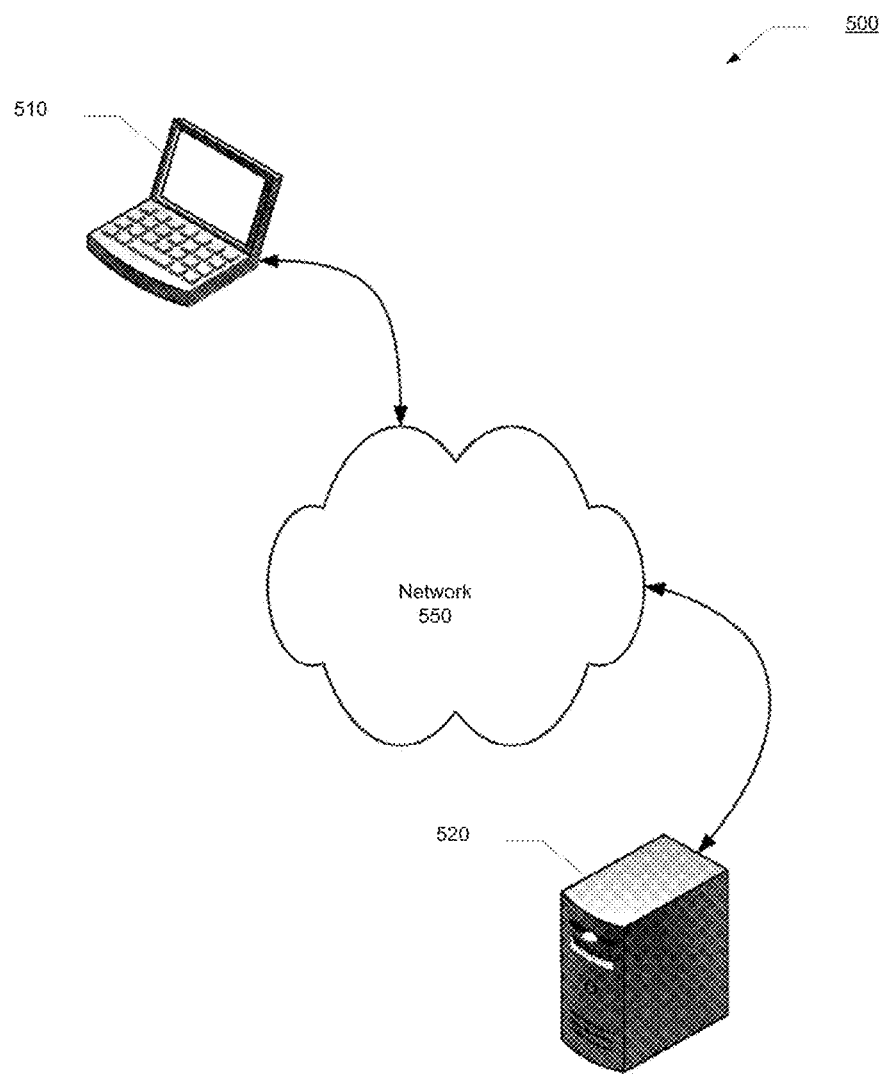
FIG. 5 is a block diagram of a system for generating fingerprints of a piece of audio according to an example embodiment.

Referring now to FIG. 5, a system 500 for identifying an audio file that shares content with an audio sample may include a client computer 510, and a server 520 coupled via a network 550. The network 550 may be or include the Internet. Although FIG. 5 shows, for ease of explanation, a single client computer and a single server, it must be understood that a large plurality of client computers may be in communication with the server 520 concurrently, and that the server 520 may comprise a plurality of servers, a server cluster, or a virtual server within a cloud.

Figure 6:
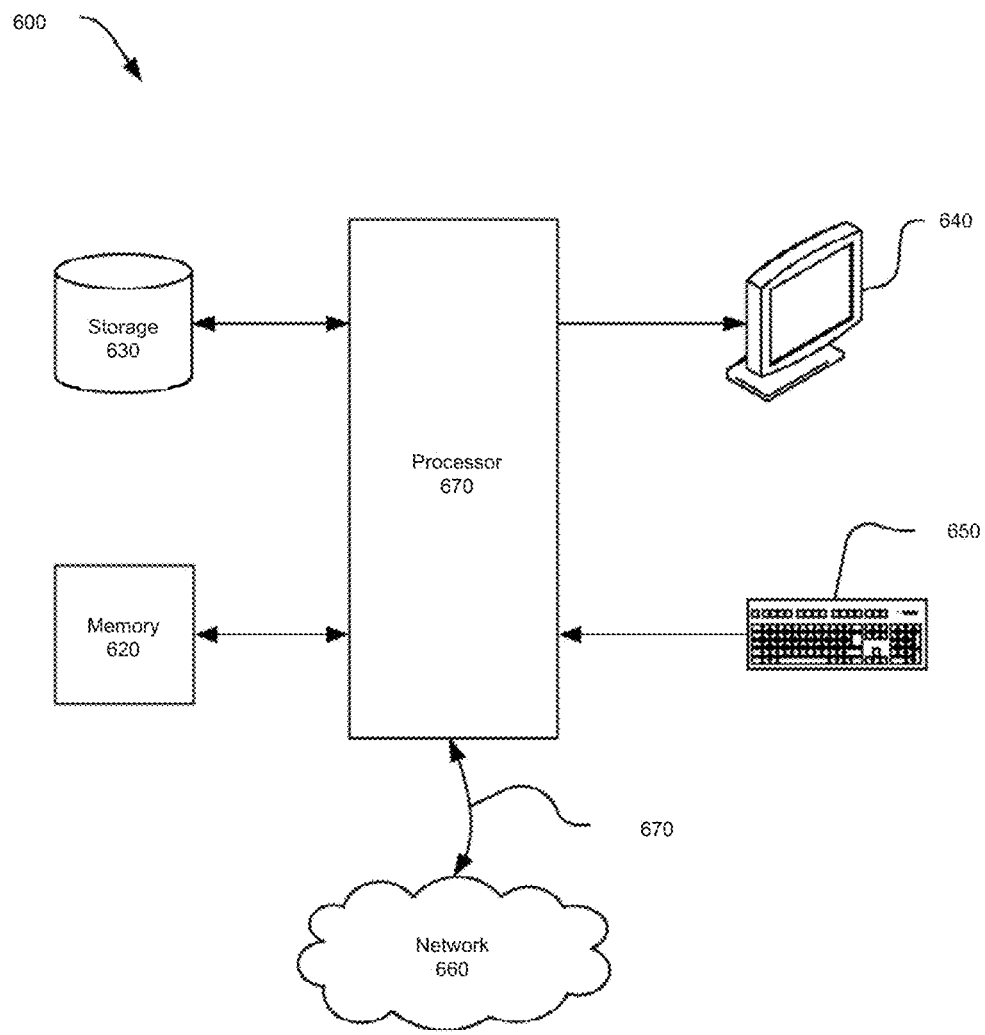
FIG. 6 is a block diagram of a computing device according to an example embodiment.

Although shown as a portable computer, the client computer 510 may be any computing device including, but not limited to, a desktop personal computer, a portable computer, a laptop computer, a computing tablet, a set top box, a video game system, a personal music player, a telephone, or a personal digital assistant. Each of the client computer 510 and the server 520 may be a computing device including at least one processor, memory, and a network interface. The server, in particular, may contain a plurality of processors. Each of the client computer 510 and the server 520 may include or be coupled to one or more storage devices. The client computer 510 may also include or be coupled to a display device and user input devices, such as a keyboard and mouse, as shown in FIG. 6.

Each of the client computer 510 and the server 520 may execute software instructions to perform the actions and methods described herein. The software instructions may be stored on a machine readable storage medium within a storage device. Machine readable storage media include, for example, magnetic media such as hard disks, floppy disks and tape; optical media such as compact disks (CD-ROM and CD-RW) and digital versatile disks (DVD and DVD±RW); flash memory cards; and other storage media. Within this patent, the term "storage medium" refers to a physical object capable of storing data. The term "storage medium" does not encompass transitory media, such as propagating signals or waveforms.

Each of the client computer 510 and the server 520 may run an operating system, including, for example, variations of the Linux, Microsoft Windows, Symbian, and Apple Mac operating systems. To access the Internet, the client computer may run a browser such as Microsoft Explorer or Mozilla Firefox, and an e-mail program such as Microsoft Outlook or Lotus Notes. Each of the client computer 510 and the server 520 may run one or more application programs to perform the actions and methods described herein.

The client computer 510 may be used by a "requestor" to send a query to the server 520 via the network 550. The query may request the server to identify a query audio file. The client computer 510 may generate one or more fingerprints from the query audio file according to the methods provided herein, and provide the fingerprint to the server 520 via the network 550. In this case, the method 100 of FIG. 1 may be performed by the client computer 510, and the method of 400 of FIG. 4 may be performed by the server 520. Alternatively, the client computer may provide the query audio file to the server as a series of time-domain samples, in which case the process 100 of FIG. 1 and the method 400 of FIG. 4 may be performed by the server 520.

However, also parts of the method 400, e.g. the generating 410 and/or comparing 420 could be executed on the client computer while the server 520 could provide reference fingerprints to the client computer 520 by accessing the database 300. It should be appreciated that server 520 may utilize the method 100 for extracting reference fingerprints for the reference audio files or audio content information accessible and/or stored on the database 300. Hence, prior to the comparing 420, the server may have extracted reference audio fingerprints of at least one audio file to be used in the comparing 420 being executed on the client computer and/or server 520 or alternatively both simultaneously in order to speed up the comparing process.

FIG. 6 is a block diagram of a computing device 600 which may be suitable for use as the client computer 510 and/or the server 520 of FIG. 5. The computing device 600 may include a processor 610 coupled to memory 620 and a storage device 630. The processor 610 may include one or more microprocessor chips and supporting circuit devices. The storage device 630 may include a machine readable storage medium as previously described. The machine readable storage medium may store instructions that, when executed by the processor 610, cause the computing device 600 to perform some or all of the processes described herein.

The processor 610 may be coupled to a network 660, which may be or include the Internet, via a communications link 670. The processor 610 may be coupled to peripheral devices such as a display 640, a keyboard or some type of input device 650, and other devices that are not shown.

The invention claimed is:

1. A method for generating fingerprints for audio content information, the method comprising:
   generating a frequency representation of the audio content information, wherein the frequency representation represents information about at least a number of frequencies within a time range containing a number of time frames of the audio content information and a level associated with each of said frequencies;
   selecting a plurality of areas from said frequency representation, wherein each of the plurality of areas comprises information about a sub-range of frequencies and a sub-range of time frames of the audio content information;
   generating a first fingerprint for a first selected area of the plurality of areas by applying a trained neural network that converts the plurality of areas into respective fingerprints in a metric space, wherein the neural network is trained such that the neural network produces the same or similar fingerprints for at least two areas of the plurality of areas when the at least two areas of the plurality of areas contain the same frequency representation of audio content information, regardless of the position of the at least two areas in said frequency representation;
   comparing the first fingerprint to at least one reference fingerprint accessible by a database and generated from a set of reference audio files, by calculating a distance between the first fingerprint and at least one reference fingerprint, using a specified distance metric; and
   identifying a reference audio file, having at least one associated reference fingerprint with an associated distance from the first fingerprint satisfying a predetermined threshold.

2. The method as defined in claim 1, further comprising outputting information about the identified reference audio file to a user.

3. The method as defined in claim 1, wherein the first selected area is pre-sized.

4. The method as defined in claim 1, wherein the trained neural network is trained using a Siamese network architecture.

5. The method as defined in claim 4, wherein the trained neural network is trained such that the trained neural network produces a different fingerprint for the first selected area and at least one additional area of the plurality of areas when the first selected area and the at least one additional area contain different audio content information.

6. The method as defined in claim 1, wherein the trained neural network comprises a number of convolutional layers and/or filters and/or non-linear functions to be applied to the plurality of areas in sequence.

7. The method as defined in claim 1, wherein the trained neural network is trained such that the trained neural network produces a different fingerprint for the first selected area and at least one additional area of the plurality of areas when the first selected area and the at least one additional area contain different audio content information.

8. The method as defined in claim 1, further comprising storing a number of generated fingerprints associated with an audio file containing audio content information in a memory together with some corresponding frequency information.

9. The method as defined in claim 1, wherein the calculated distance relates to a Hamming distance.

10. The method of claim 1, wherein:
    the generated fingerprints are independent of time of the audio content information; and
    the reference audio file is a derivative work of the audio content information identified by comparing, independently of time, the first fingerprint of the audio content information with at least one reference fingerprint of the reference audio file.

11. The method of claim 1, further comprising:
    generating a second fingerprint for a second selected area of the plurality of areas;
    determining that the first fingerprint and the second fingerprints match; and
    storing the first fingerprint in the database without storing the second fingerprint that matches the first fingerprint.

12. A non-transitory computer readable storage medium having instructions stored thereon that, when executed by a computing device, cause the computing device to:
    generate a frequency representation of the audio content information; wherein the frequency representation represents information about at least a number of frequencies within a time range containing a number of time frames of the audio content information and a level associated with each of said frequencies;
    select a plurality of areas from said frequency representation, wherein each of the plurality of areas comprises information about a sub-range of frequencies and a sub-range of time frames of the audio content information;
    generate a first fingerprint for a first selected area of the plurality of areas by applying a trained neural network that converts the plurality of areas into respective fingerprints in a metric space, wherein the neural network is trained such that the neural network produces the same or similar fingerprints for at least two areas of the plurality of areas when the at least two areas of the plurality of areas contain the same frequency representation of audio content information, regardless of the position of the at least two areas in said frequency representation;
    compare the first fingerprint to at least one reference fingerprint accessible by a database and generated from a set of reference audio files, by calculating a distance between the first fingerprint and at least one reference fingerprint, using a specified distance metric; and
    identify a reference audio file, having at least one associated reference fingerprint with an associated distance from the first fingerprint satisfying a predetermined threshold.

13. A server system comprising one or more processors and memory storing one or more programs executable by the one or more processors, the one or more programs including instructions for:
    generating a frequency representation of the audio content information, wherein the frequency representation represents information about at least a number of frequencies within a time range containing a number of time frames of the audio content information and a level associated with each of said frequencies;
    selecting a plurality of areas from said frequency representation, wherein each of the plurality of areas comprises information about a sub-range of frequencies and a sub-range of time frames of the audio content information;
    generating a first fingerprint for a first selected area of the plurality of areas by applying a trained neural network that converts the plurality of areas into respective fingerprints in a metric space, wherein the neural network is trained such that the neural network produces the same or similar fingerprints for at least two areas of the plurality of areas when the at least two areas of the plurality of areas contain the same frequency representation of audio content information, regardless of the position of the at least two areas in said frequency representation;

comparing the first fingerprint to at least one reference fingerprint accessible by a database and generated from a set of reference audio files, by calculating a distance between the first fingerprint and at least one reference fingerprint, using a specified distance metric; and identifying a reference audio file, having at least one associated reference fingerprint with an associated distance from the first fingerprint satisfying a predetermined threshold.

* * * * *